(12) United States Patent
Bost

(10) Patent No.: US 6,428,034 B1
(45) Date of Patent: Aug. 6, 2002

(54) BUGGY

(75) Inventor: Bart Willem Jozef Bost, Maastricht (NL)

(73) Assignee: Maxi Miliaan B.V., Helmond (NL)

( * ) Notice: Subject to any disclaimer, the term of this patent is extended or adjusted under 35 U.S.C. 154(b) by 0 days.

(21) Appl. No.: 09/594,984

(22) Filed: Jun. 15, 2000

(30) Foreign Application Priority Data

Jun. 15, 1999 (NL) .............................................. 1012334

(51) Int. Cl.[7] .............................. B62B 9/00; B62B 7/00
(52) U.S. Cl. ........................ 280/650; 280/658; 280/642; 280/47.4
(58) Field of Search ................................ 280/650, 657, 280/658, 655, 647, 642, 641, 639, 47.38, 79.2, 47.4

(56) References Cited

U.S. PATENT DOCUMENTS

| | | | | |
|---|---|---|---|---|
| 4,118,052 A | * | 10/1978 | Cabagnero | 280/642 |
| 4,317,581 A | * | 3/1982 | Kassai | 280/658 |
| 4,542,916 A | * | 9/1985 | Kassai | 280/642 |
| 4,697,823 A | * | 10/1987 | Kassai | 280/658 |
| 4,768,795 A | * | 9/1988 | Mar | 280/650 |
| 5,755,455 A | | 5/1998 | Chen et al. | |

FOREIGN PATENT DOCUMENTS

| | | |
|---|---|---|
| DE | 94 00 177.4 | 6/1994 |
| DE | 43 28 567 A1 | 3/1995 |
| DE | 298 22 844 U1 | 6/1999 |

* cited by examiner

*Primary Examiner*—Brian L. Johnson
*Assistant Examiner*—Matt Luby
(74) *Attorney, Agent, or Firm*—Barnes & Thornburg

(57) ABSTRACT

A buggy comprising at least two pairs of legs, wherein each pair comprises a first leg and a second leg, which are each fitted with a wheel at one end. The first and the second leg of each pair are pivotally interconnected by means of a main pivot at a location some distance away from said wheels. The first and the second leg of each pair are furthermore interconnected by means of a girder between said main pivot and said wheel. The girder is pivotally connected to the first leg with a first end and to an element which is slidably disposed along the second leg with a second end.

9 Claims, 16 Drawing Sheets

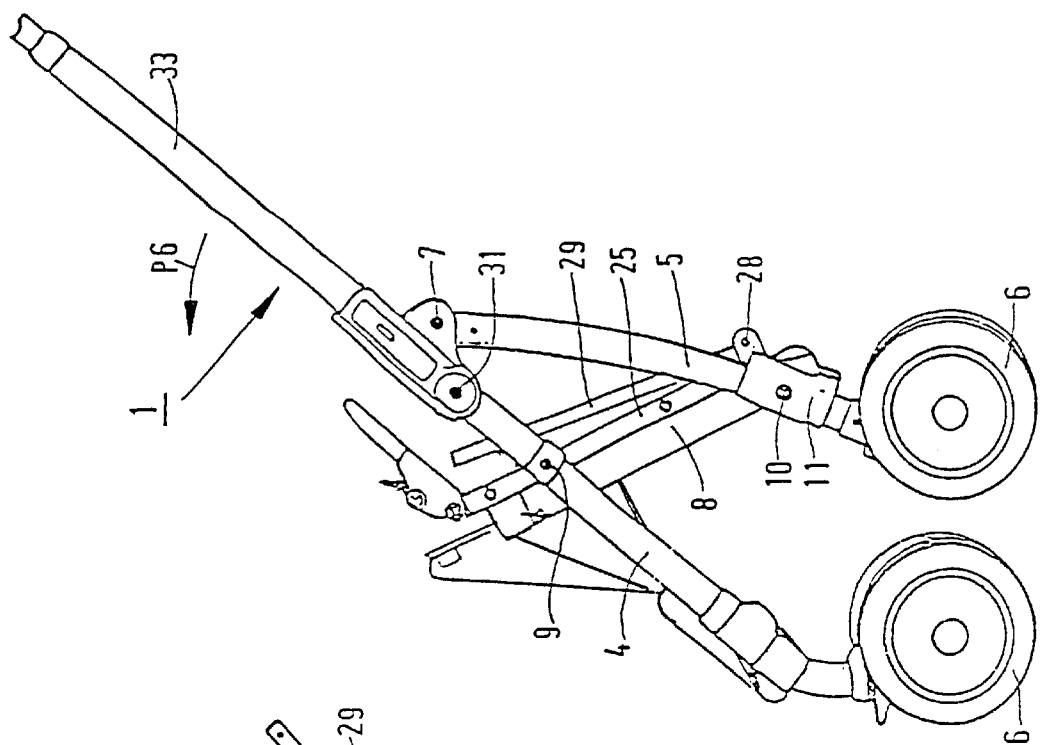
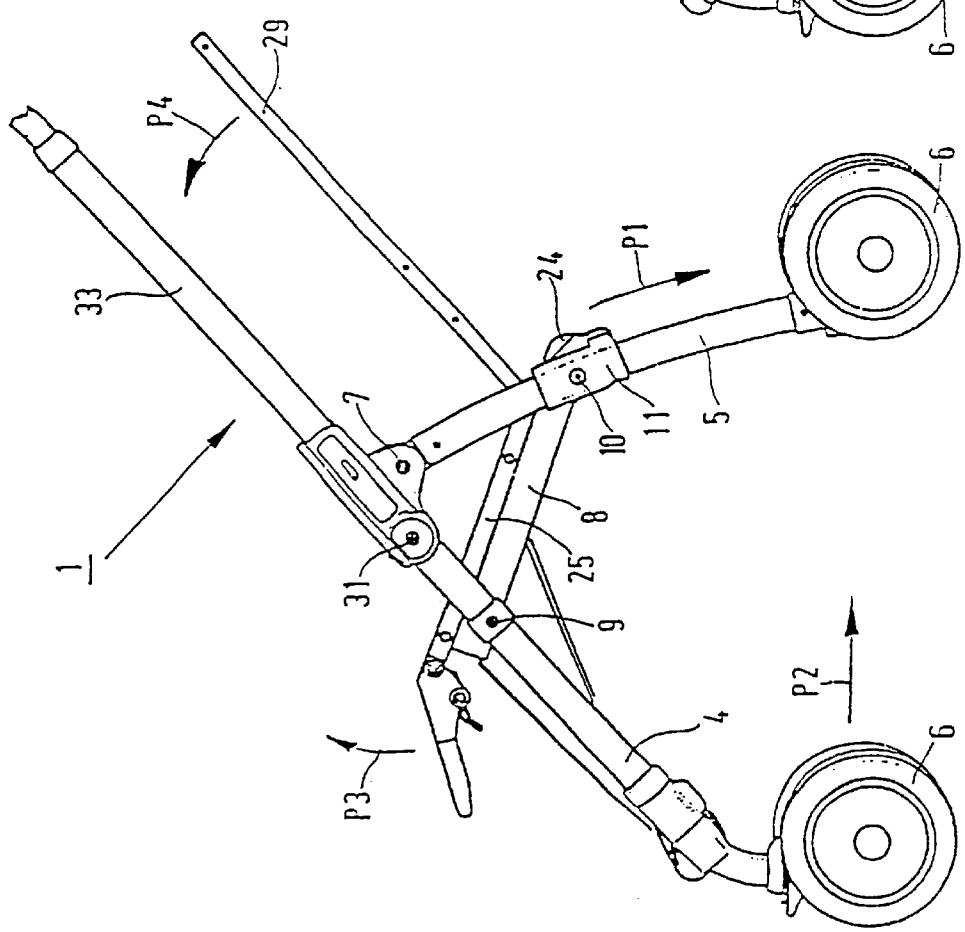
FIG.2a
FIG.2b

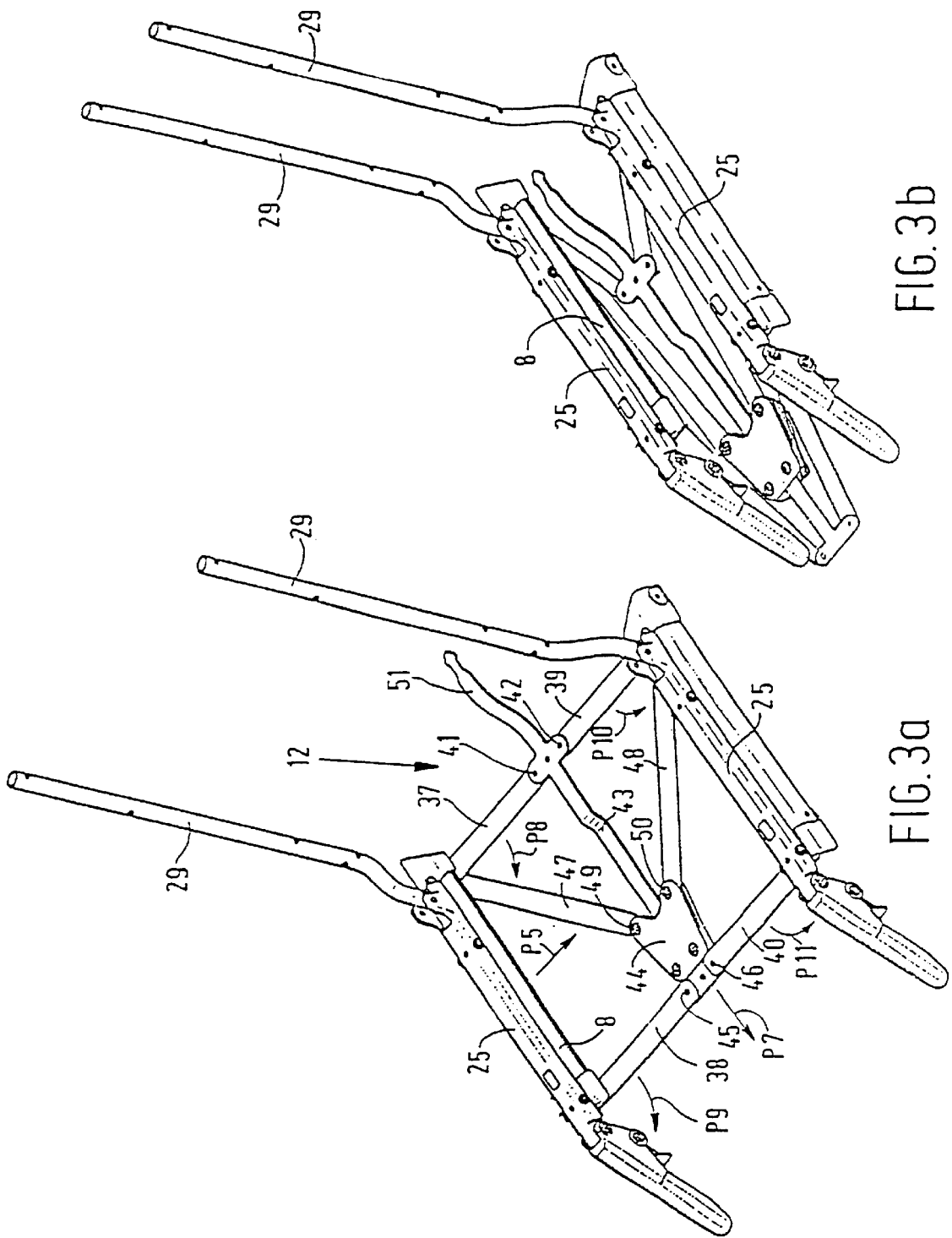

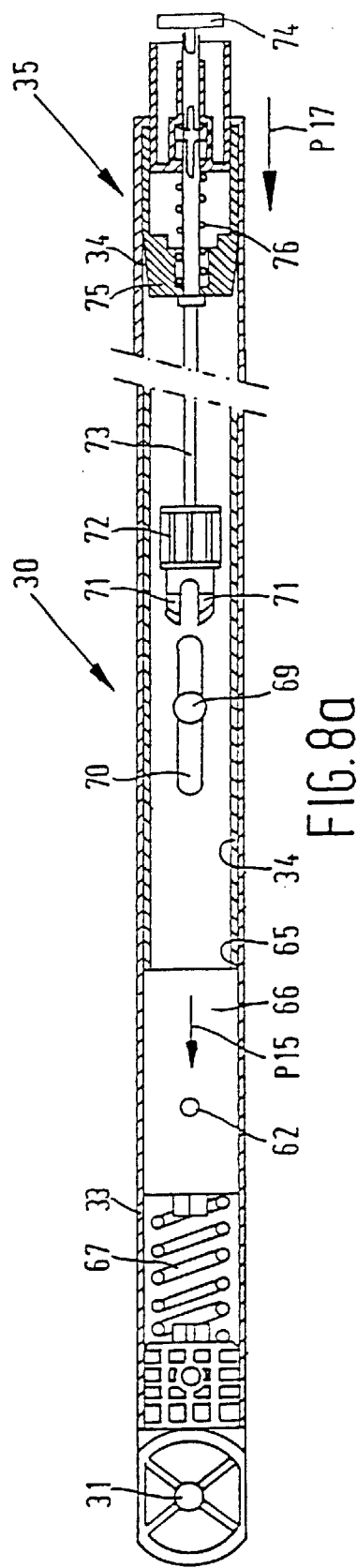

BUGGY

BACKGROUND OF THE INVENTION

The invention relates to a buggy comprising at least two pairs of legs, wherein each pair comprises a first leg and a second leg, which are each fitted with a wheel at one end, the first and the second leg of each pair are pivotally interconnected by means of a main pivot at a location some distance away from said wheels, wherein the first and the second leg of each pair are furthermore interconnected by means of a girder between said main pivot and said wheel, which girder is pivotally connected to the first leg with a first end and to an element which is slidably disposed along the second leg with a second end, whilst furthermore the two pairs of legs are interconnected by means of at least two collapsible rod mechanisms, wherein the first rod mechanism extends between the second legs of said two pairs, which first rod mechanism includes first rods which are pivotally connected to the elements which are capable of sliding movement along the second legs, as well as second rods which are pivotally connected to the second legs.

Buggies of this kind must be collapsible, compact and light-weight in order to enable easy transport in for example a car or on a bicycle. All four wheels are moved together when the buggy is being folded. At the same time such buggies must be robust in use in unfolded condition.

In a similar buggy known from German patent DE-C2-43.28.567 the space present under the plane bounded by the girders is taken up by various rods connected to the legs. As a result, said space is not available for placing a shopping basket, for example, under the girders. Moreover, the presence of various rods under the plane bounded by the girders gives the buggy an untidy appearance.

OBJECTS OF THE INVENTION

The object of the invention is to provide a buggy which is easily folded, compact, sturdy and robust and wherein furthermore the drawbacks of the known buggy are avoided.

This objective is accomplished with the buggy according to the invention in that the second rod mechanism extends between the girders of both pairs, wherein the elements which are pivotally connected to said girders are spaced from the wheels by a greater distance in an unfolded position of the buggy than in a folded position thereof.

Since the second rod mechanism extends between the girders, the second rod mechanism lies in the plane extending through the girders, as it were. The first rod mechanism extends practically completely on a side remote from the wheels of the elements which can slide over the second legs, as a result of which practically none of the rods of the rod mechanisms are disposed under the plane extending through the girders.

Since the second end is slidable with respect to the second leg, the legs can be simply swung together by moving the second end of the girder towards the wheel, as a result of which the buggy is relatively compact in folded condition.

The girder that interconnects the two legs of one pair prevents the legs from moving apart, thus providing a sturdy triangular construction.

A further stiffening is obtained by providing the two pairs of legs with one girder extending between the legs.

The two parallel pairs of legs can be moved together and apart by means of the rod mechanisms, wherein the two rod mechanisms can be locked with respect to each other in the moved-apart position so as to prevent undesirable folding of the buggy.

BRIEF DESCRIPTION OF THE DRAWINGS

The invention will now be explained in more detail with reference to the drawing, in which:

FIGS. 2a and 2b are side views of the buggy of FIG. 1 in unfolded and folded condition, respectively;

FIGS. 3a and 3b show a first rod mechanism of the buggy of FIG. 1 in unfolded and folded condition, respectively;

FIGS. 8a and 8b show the push rod of the buggy of FIG. 1 in cross-sectional side view, side view and cross-sectional top plan view, respectively;

Parts corresponding to each other are indicated by the same numerals in the figures.

DETAILED DESCRIPTION OF THE INVENTION

Figure 1:
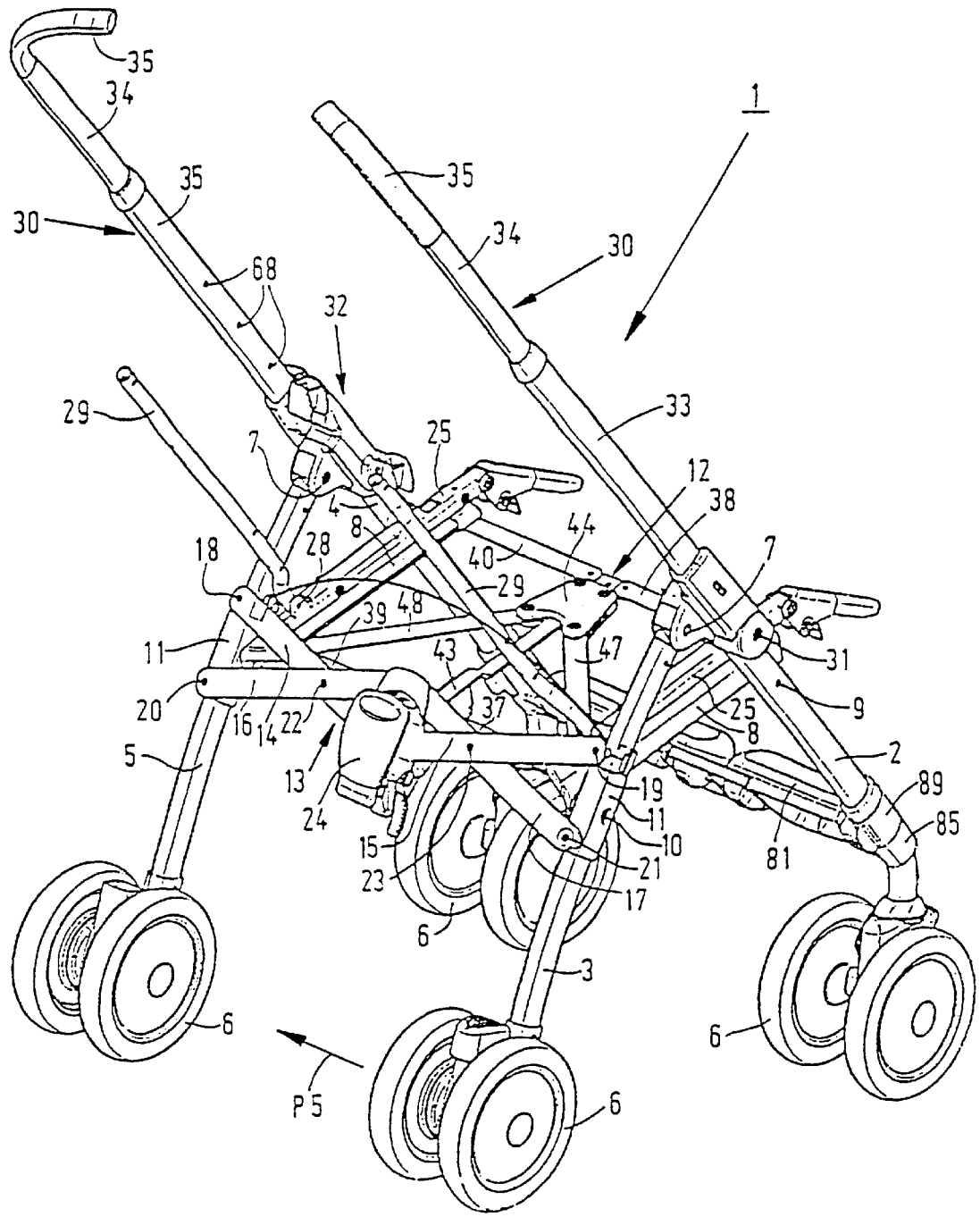
FIG. 1 is a perspective view of a buggy according to the invention.

FIG. 1 shows a buggy 1 comprising two pairs of legs 2, 3, 4, 5, wherein the legs 2, 3 of the first pair extend parallel to the legs 4, 5 of the second pair. Legs 2, 3, 4, 5 are fitted with swivelling wheels 6 at one end. Legs 2, 3; 4, 5 are pivotally interconnected by means of a main pivot 7 on a side remote from wheels 6. A girder 8 extends between legs 2, 3; 4, 5, which girder is pivotally connected to legs 2 and 4, respectively, with one end by means of a pivot pin 9 and to a block 11 which slides over legs 3 and 5, respectively, by means of a pivot pin 10. Buggy 1 furthermore comprises two collapsible rod mechanisms 12, 13, with the first rod mechanism 12 extending between girders 8 and the second rod mechanism 13 extending between the parallel legs 3, 5. First rod mechanism 12 will be explained in more detail yet with reference to FIGS. 3a and 3b. Second rod mechanism 13 includes four rods 14, 15, 16, 17. Rod 14 is pivotally connected to leg 5 by means of a pivot pin 18. Pivot pin 18 is disposed between pivot pin 7 and slidable block 11. Rod 15 is pivotally connected to leg 3 in a similar manner by means of a pivot pin 19. Rods 14 and 15 are pivotally interconnected on a side remote from pivot pins 18, 19, centrally between legs 3, 5. Rod 16 is pivotally connected to the slidable block 11 of leg 5 by means of a pivot pin 20. Rod 17 is pivotally connected to block 11 of leg 3 in a similar manner by means of a pivot pin 21. Rods 16 and 17 are pivotally interconnected on sides remote from pivot pins 20, 21, centrally between legs 3, 5. In addition, rods 14, 16 are pivotally interconnected by means of a pivot pin 22, and rods 15, 17 are pivotally interconnected by means of a pivot pin 23. A lock 24 is provided near the centre between legs 3, 5, which lock will be explained in more detail yet with reference to FIGS. 11a–11d. First rod mechanism 12 and second rod mechanism 13 are firmly locked together by means of said lock, so that possible collapsing of one or both rod mechanisms 12, 13 is effectively prevented.

Figure 4:
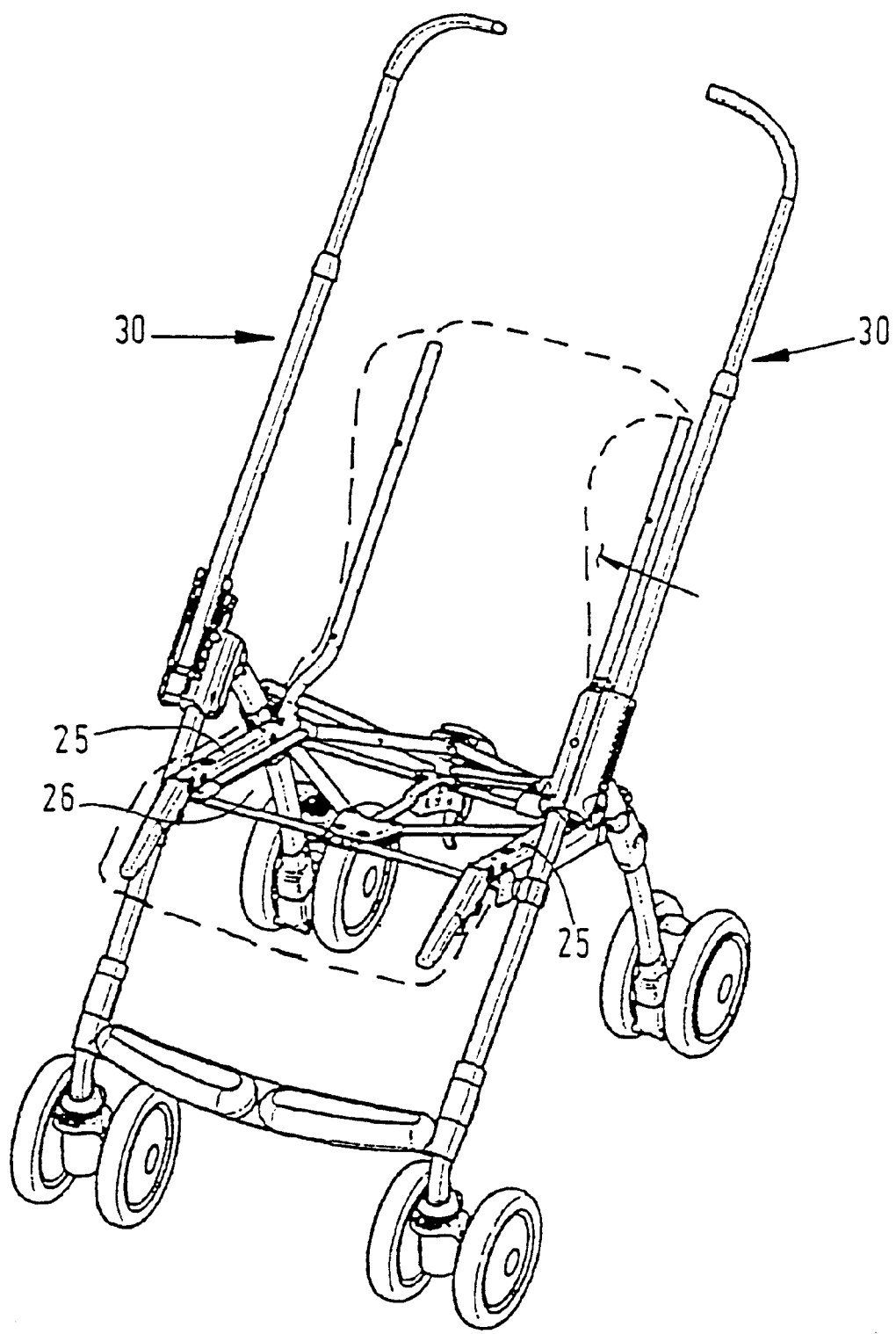
FIG. 4 shows the buggy of FIG. 1 provided with a seat and a back.

Two sections 25 are detachably attached to first rod mechanism 12. A seat 26 (see FIG. 4) is attached to said sections 25. Furthermore, supports 29 for a seat back are pivotally connected to sections 25.

Buggy 1 furthermore comprises two push rods 30, which extend parallel to legs 2, 4. Each push rod 30 is pivotally connected to the respective leg 2, 4 by means of a pivot pin 31, whereby push rod 30 can be fixed in the unfolded position shown in FIG. 1 by means of a locking element 32. Locking element 32 will be explained in more detail yet with reference to FIGS. 7a and 7b. Each push rod 30 includes two telescopic tubes 33, 34, whereby tube 34 can be moved into and out of tube 33 so as to adjust the desired length of the push rod. The length adjusting mechanism will be explained in more detail yet with reference to FIGS. 8a–8c. Tube 34 is fitted with a handle 35 at an end remote from tube 33.

FIGS. 2a and 2b are side views of the buggy of FIG. 1 in unfolded and folded position, respectively.

If it is desired to move buggy 1 from the unfolded position shown in FIG. 2a to the folded position shown in FIG. 2b, lock 24 is released in a manner yet to be explained in more detail with reference to FIGS. 11a–11d, after which blocks 11 can be moved along legs 3, 5 in the direction indicated by arrow P1. As a result, also the pivot pins 10 of girders 8 will be moved in the direction indicated by arrow P1. The form of the triangle formed by legs 4, 5 and girder 8, which is bounded by pivot pins 7, 9, 10 will change thereby, since the distance between the pivot pins 7, 10 will increase. Since the distance between pivot pins 7, 9 and 9, 10 will remain constant, the pivot pins will be moved in the direction indicated by arrow P2 towards leg 3, 5 as a result of the movement of pivot pin 10 in the direction indicated by arrow P1. Girders 8 will thereby tilt in the direction indicated by arrow P3. Back supports 29 will then be tilted in the direction indicated by arrow P4.

As is clearly shown in FIG. 1, the distance between pivot pins 19, 21 and pivot pins 18, 20 will increase as a result of the movement of blocks 11 in the direction indicated by arrow P1, causing rods 14–17 to pivot with respect to each other, whereby legs 3, 5 will be pulled towards each other in the direction indicated by arrow P5.

As will be apparent from the description of FIGS. 3a and 3b, also the first rod mechanism 12 will be folded thereby, so that also girders 8 and legs 2, 4 will be moved in the direction indicated by arrow P5. Thus the movement of blocks 11 in the direction indicated by arrow P1 causes legs 2, 3, legs 4, 5 as well as pairs of legs 2, 3 and 4, 5, respectively, to move together in the direction indicated by arrows P2 and P5, respectively. The buggy 1 is thereby moved from the unfolded position shown in FIG. 2a to the folded position shown in FIG. 2b. The push rods 33 can then be tilted about pivot pins 31 in the direction indicated by arrow P6, if desired, as a result of which buggy 1 is folded even further.

FIGS. 3a and 3b show the first rod mechanism 12 with sections 25 and back supports 29 in unfolded and folded position, respectively. Rod mechanism 12 comprises four strips 37, 38, 39, 40 extending transversely to girders 8, which strips are pivotally connected to corner points of girders 8. The strips 37, 39 which are positioned near legs 3, 5 are pivotally connected to a main strip extending parallel to girders 8 by means of pivot pins 41, 42. Main strip 43 includes a plate member 44 on one side remote from pivot pins 41, 42, to which strips 38, 40 are pivotally connected by means of pivot pins 45, 46. First rod mechanism 12 furthermore includes two strips 47, 48, which are pivotally connected with a first end to one end of strips 37 and 39, respectively, positioned near girder 8. Strips 47, 48 are pivotally connected with their other end to plate member 44 by means of pivot pins 49, 50.

Main strip 43 includes a bent-over strip 51 at one end remote from plate member 44, which strip is at least partially retained in lock 24 in the unfolded position of the buggy 1 which is shown in FIG. 1. When lock 24 is released, strip 51, and thus main strip 43, is moved in the direction indicated by arrow P7. As a result, strips 37–40 are pivoted in the directions indicated by arrows P8–P11, as a result of which girders 8 are moved towards each other in the direction indicated by arrow P5.

Figure 5:
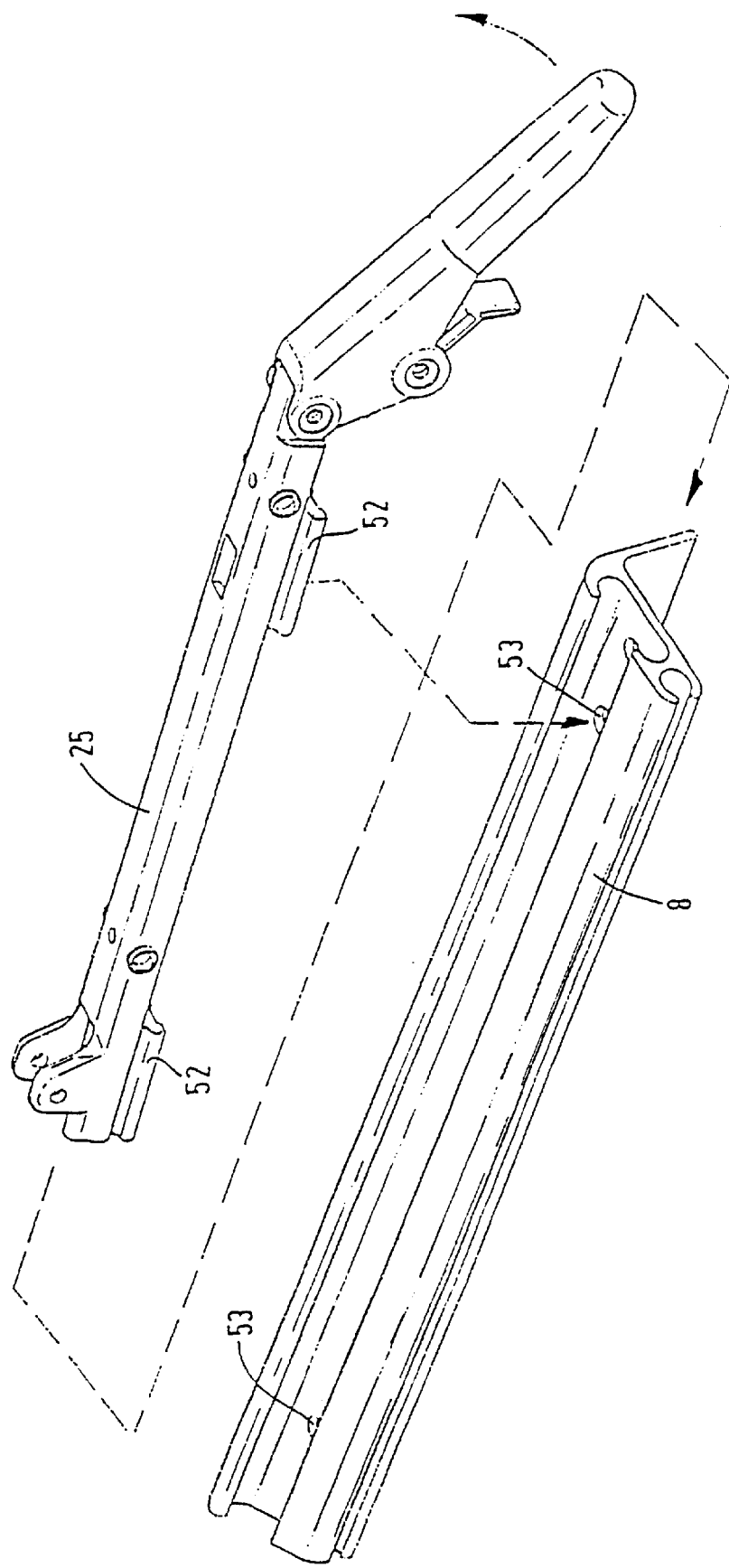
FIG. 5 is a perspective view of the attachment of the seat to the girder of the buggy which is shown in FIG. 1.
Figure 6:
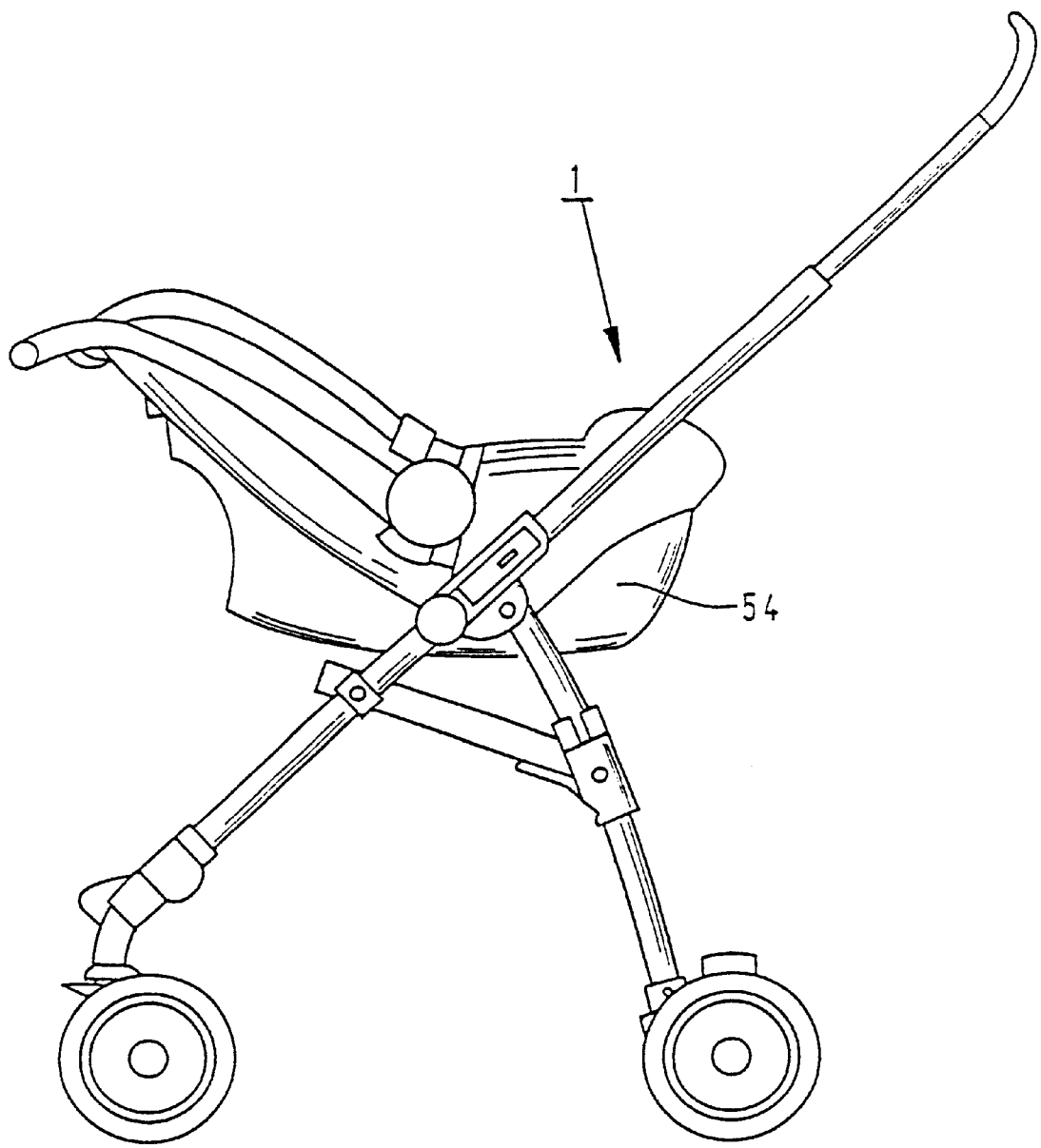
FIG. 6 shows the buggy according to the invention, which is fitted with a reclining bucket seat.

FIG. 5 shows the detachable connection of section 25 to girder 25. Section 25 is to that end provided with cams 52 capable of sliding movement in girder 8, in which elements which can be moved against spring force are present, which can be brought into engagement with recesses 53 formed in girder 8. Since sections 25 can be removed from buggy 1, it is possible to exchange the seat 26 connected thereto in case of wear or clean it in a simple manner. In addition it thus readily possible to make the buggy 1 suitable for transporting a bucket-shaped shell 54 (see FIG. 6) for transporting a baby.

Figure 7A:
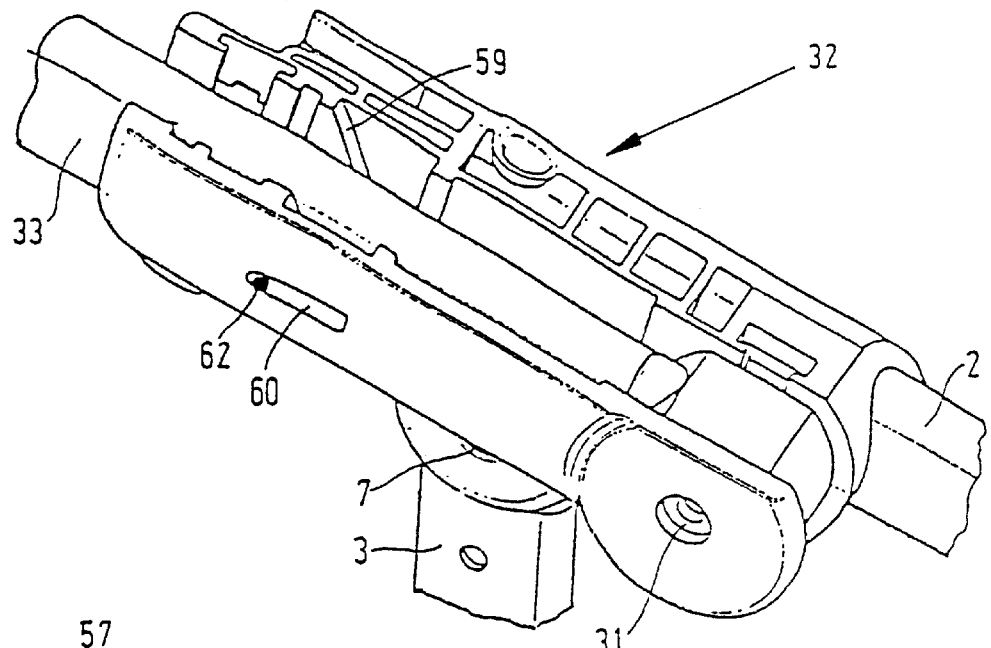
FIGS. 7a and 7b show a push rod of the buggy of FIG. 1 in unfolded and folded condition, respectively.
Figure 7B:
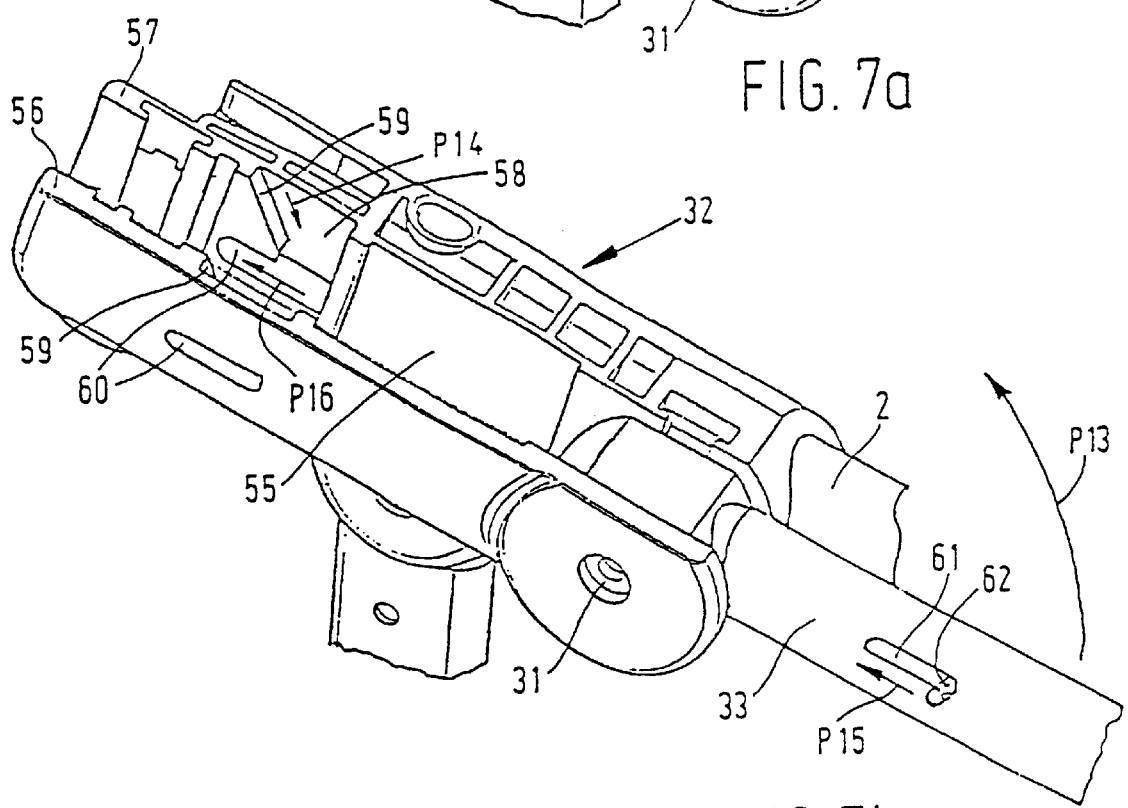

FIGS. 7a and 7b show tube 33 of push rod 30 in unfolded and folded position, respectively.

As already indicated at FIG. 1, tube 33 is pivotally connected to leg 2 by means of a pivot pin 31. Pivot pin 31 forms part of the locking mechanism 32, which furthermore includes a slot 55 which extends parallel to tube 33. Slot 55 is bounded by two parallel wall parts 56, 57. Wall parts 56, 57 are each provided with a recess 58, which is bounded on one side by a sloping wall part 59. Recess 58 opens into a blind slot 60 at one end of wall part 59. Tube 33 is provided with a pin 62 which is capable of movement against spring force in a slot 61.

Tube 33 is tilted about pivot pin 31 in the direction indicated by arrow P13 in order to move said tube 33 from the folded position which is shown in FIG. 7b to the unfolded position which is shown in FIG. 7a. After having tilted nearly 180 degrees, pin 62 comes into contact with the upper side of sloping wall part 59. By tilting tube 33 further in the direction indicated by arrow P13, pin 62 is moved along wall part 59 in the direction indicated by arrow P14, whereby pin 62 is moved in slot 61 in the direction indicated by arrow P15. As soon as pin 62 has reached the end of wall part 59, spring force will cause pin 62 to move into slot 60 in the direction indicated by arrow P16, opposed to the direction indicated by arrow P15.

FIGS. 8a–8c show the push rod 30 which, as described above with reference to FIG. 1, includes a tube 33 and a tube 34 which is capable of sliding movement therein. Disposed between pivot pin 31 and an end 65 remote from the handle 35 of tube 34 is a block 66, which supports tube 33 and pin 62. A spring 67 is provided between block 66 and pivot pin 31. Block 66 is capable of movement in the direction indicated by arrow P15 against the spring force of spring 67. Between block 66 and handle 35, tube 33 is furthermore provided with a number of positioning holes 68. The tube 34 disposed within tube 33 is provided with a pin 69, which is pressed in a direction towards positioning holes 68 by means of a spring 70. Disposed within tube 34 is furthermore a block 72 provided with fingers 71, which is connected to a flexible rod 73 including an unlocking knob 74 present in handle 35. Handle 35 furthermore includes a support 75, with a spring 76 being disposed between unlocking knob 74 and support 75.

The operation of push rod 30 is as follows. When the length of push rod 30 is to be adjusted, the unlocking knob 74 is pressed in the direction indicated by arrow P17 against the spring force of fingers 76, as a result of which fingers 71 engage round pin 69 and press pin 69 out of positioning opening 68. Then tube 34 can be moved with respect to tube 33 until pin 69 is positioned opposite the new desired positioning opening 68. When knob 74 is released, knob 74 is moved in the direction opposite the direction indicated by arrow P17, as a result of which the fingers 71 are simultaneously moved away from pin 69 and pin 69 will move into opening 68.

Push knob 74 is depressed again in order to swing push rod 30 to the position shown in FIG. 7b, causing pin 69 to move out of positioning opening 68 and making it possible to slide tube 34 completely into tube 33. The end 65 of tube 34 thereby comes to abut against the block 66 present in tube 33. By pressing tube 34 further into tube 33, block 66 is moved in the direction indicated by arrow P15, as a result of which pin 62 is moved out of slot 60 in the direction opposed to the direction indicated by arrow P16, after which tube 33 can be tilted in the direction opposed to the direction indicated by arrow P13 (see FIGS. 7a and 7b). In this manner it is possible, using a single knob 74, to effect a length adjustment of the push rod as well as to disconnect tube 33 from the locking mechanism 32.

Figure 9A:
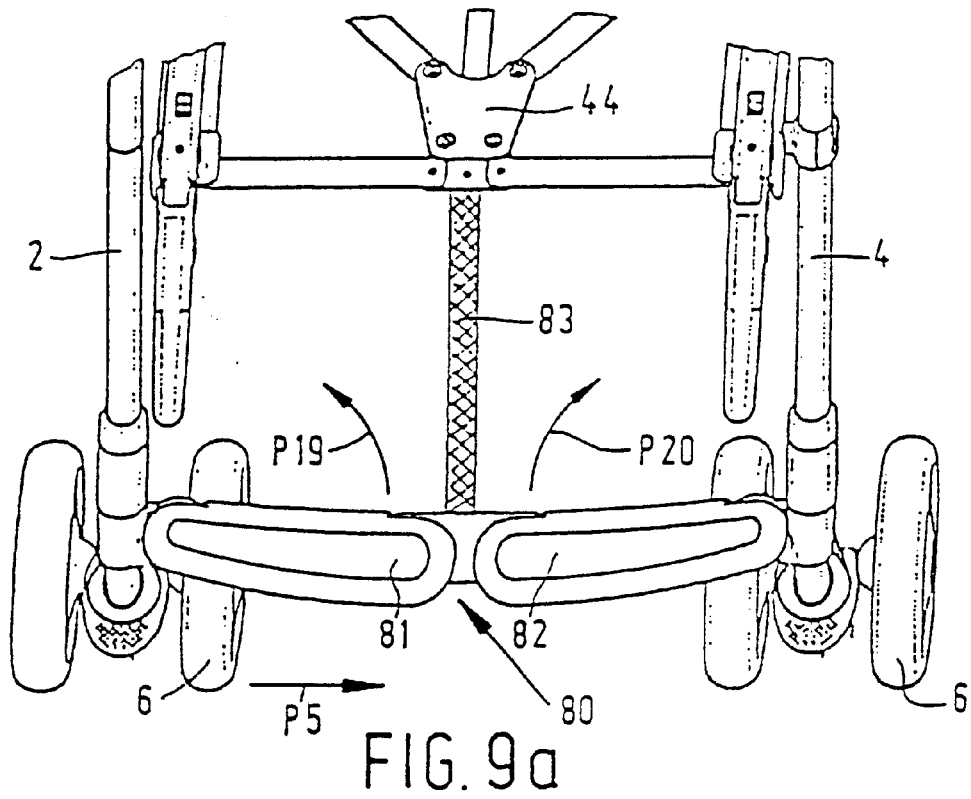
FIGS. 9a and 9b are front views of a part of the buggy of FIG. 1 in unfolded and partially folded condition, respectively.
Figure 9B:
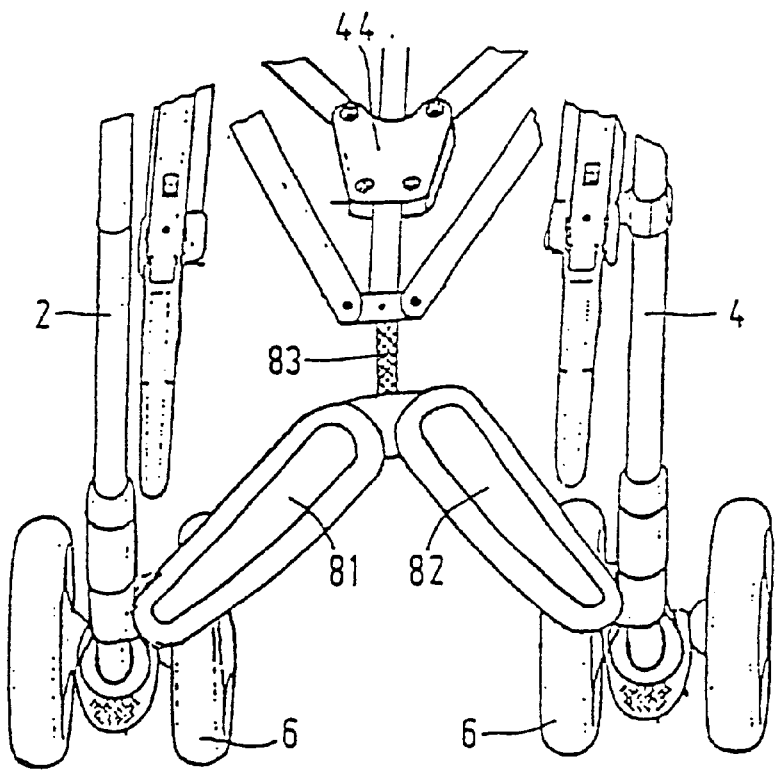

FIGS. 9a and 9b are front views of a part of the buggy 1 which is shown in FIG. 1 in, respectively, the unfolded and the partially folded position.

Buggy 1 is fitted with a footrest 80 near the wheels 6 that are connected to legs 2, 4, which footrest comprises two supports 81, 82. Support 81 is pivotally connected to leg 2, whilst support 82 is pivotally connected to leg 4. On a side remote from legs 2, 4, supports 81, 82 are pivotally interconnected via a central member 80'. Near this side, central member 80' is furthermore connected to a strap 83, which is connected to plate member 44 on a side remote from supports 81, 82. When buggy 1 is being folded, supports 81, 82 are pivoted in the directions indicated by arrows P19, P20, towards and beyond the position shown in FIG. 9b, by the strap 83 connected to central member 80'.

Figure 10A:
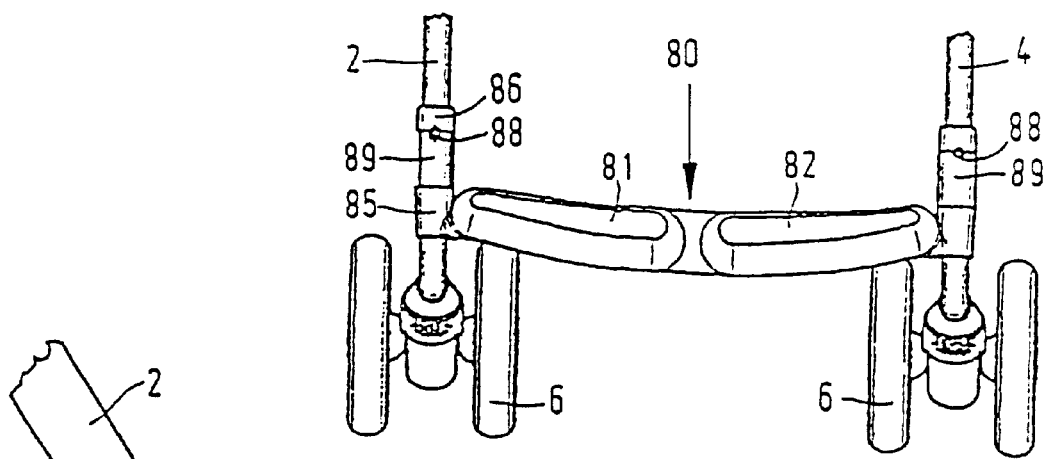
FIGS. 10a–10d show the vertical adjustment of the footboard of the buggy of FIG. 1.
Figure 10B:
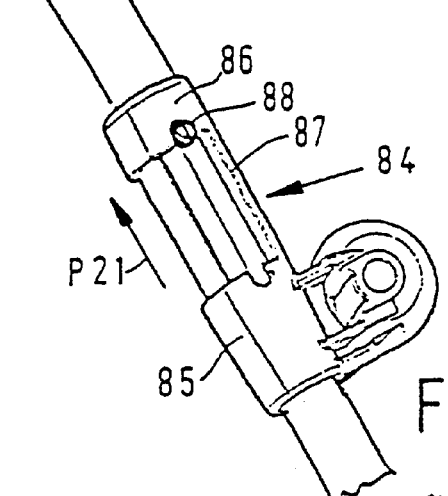
Figure 10C:
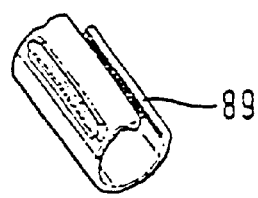
Figure 10D:
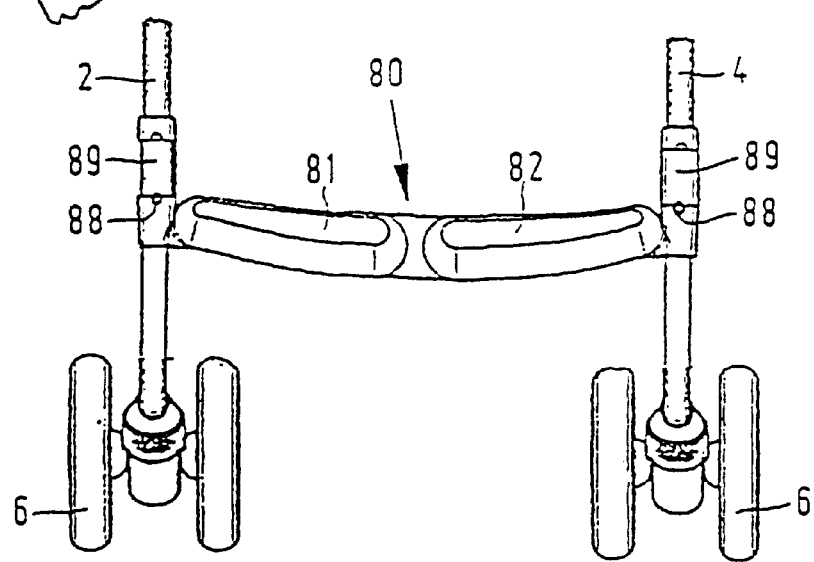

FIGS. 10a—10d show the vertical adjustment of the footrest 80. Buggy 1 is to that end provided with two elements 84 which are movably fitted over legs 2, 4, which elements each comprise two annular members 85, 86 and one plate member 87 extending therebetween. Present in tubes 2, 4 is a fixedly disposed pin 88, which pin abuts against annular member 84 in the position of element 84 which is shown in FIG. 10b. A clamping sleeve 89 (FIG. 10c) can be fitted between annular element 85, 86. When clamping sleeve 89 is fitted round tubes 2, 4, element 84 is firmly connected to tubes 2, 4. If it is desired to move footrest 80 from the position shown in FIG. 10a to the higher position as shown in FIG. 10d, clamping pieces 89 are removed, after which elements 84 can be moved in the direction indicated by arrow P21 until pins 88 abut against members 85. Then the clamping pieces 89 are fitted round legs 2, 4 again and footrest 80 will occupy the higher position which is shown in FIG. 10d.

FIGS. 11a–11d show the lock 24 by means of which the first rod mechanism 12 can be connected to the second rod mechanism 13. Lock 24 includes a block 90, which is connected to main strip 43 and which is disposed under strip 51. Block 90 comprises a pin 91 which extends transversely to the plane of the drawing. Lock 24 furthermore comprises a part 92 which is connected to second rod mechanism 13, which part 92 includes a first part 93 which is connected to rod 14 (see FIG. 12) and a part 95 which is pivotally connected to part 93 by means of a pivot pin 94. Part 95 includes a hook 96 which can be positioned round pin 91. A handle 97 is present on a side of part 95 remote from hook 96.

Figure 12:
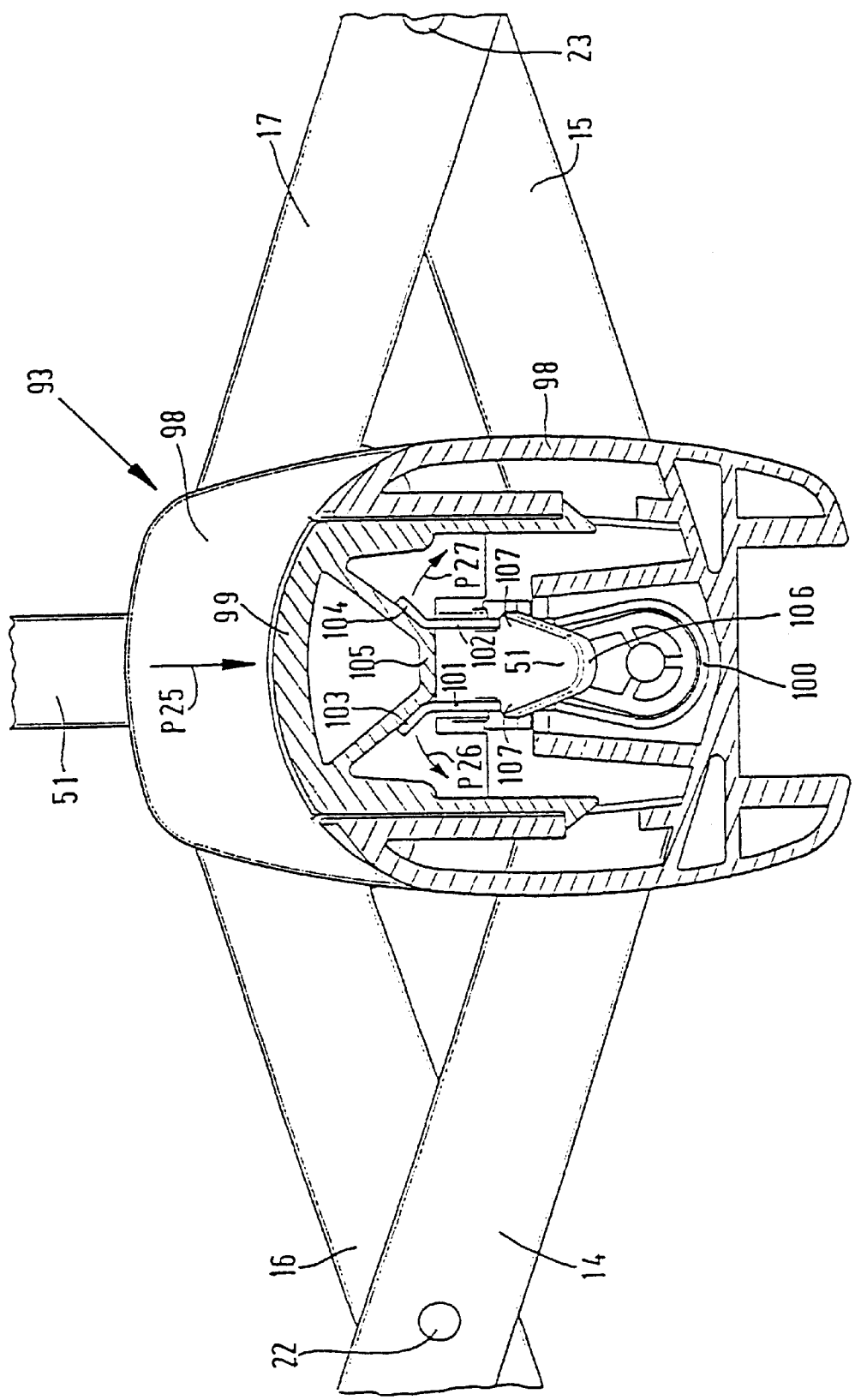
FIG. 12 is a cross-sectional view of a part of the locking arrangement which is shown in FIG. 11.

FIG. 12 is a cross-sectional view of the rod mechanisms 12, 13 which are locked together by means of part 93. As is clearly shown in FIG. 12, part 93 comprises a housing 98 connected to rod 14, in which an operating knob 99 which is movable in the direction indicated by arrow P25 and in a direction opposite thereto is present. Disposed in housing 98 is furthermore a U-shaped wire spring 100, whose legs 101, 102 abut with their tapered ends 103, 104 against a part 105 of operating knob 99. When operating knob 99 is moved in the direction indicated by arrow P25 against the spring force of wire spring 100, the ends 103 and 104 of legs 101 and 102 are moved in directions away from each other as indicated by arrows P26, P27 by means of part 105.

The operation of lock 24 will now be explained in more detail with reference to FIGS. 11a–11d and FIG. 12.

Figure 11A:
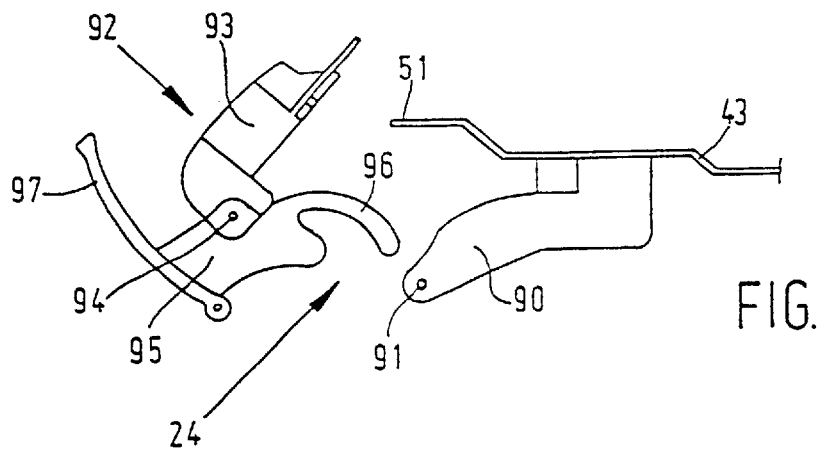
FIGS. 11a–11d show the locking arrangement of the two rod mechanisms of the buggy of FIG. 1.
Figure 11B:
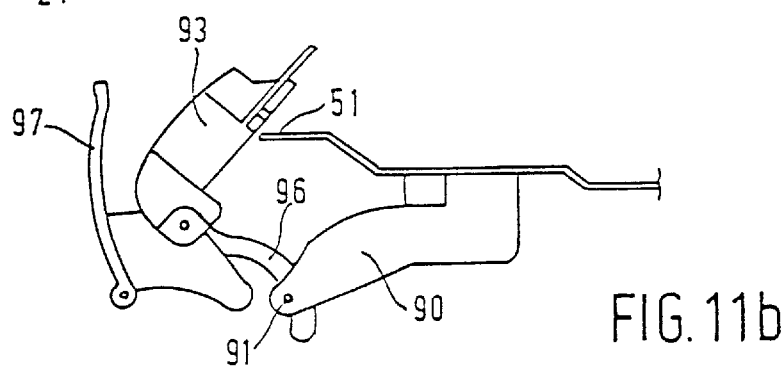
Figure 11C:
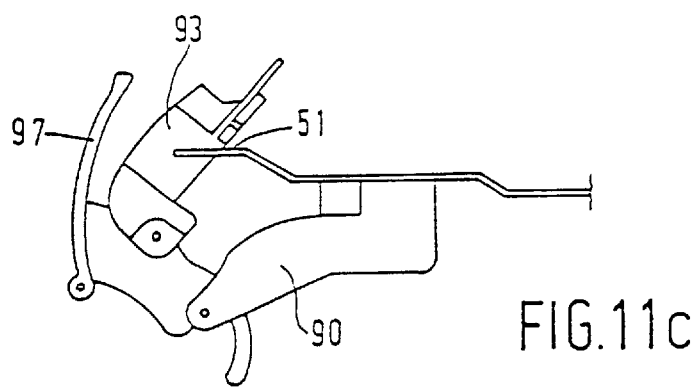
Figure 11D:
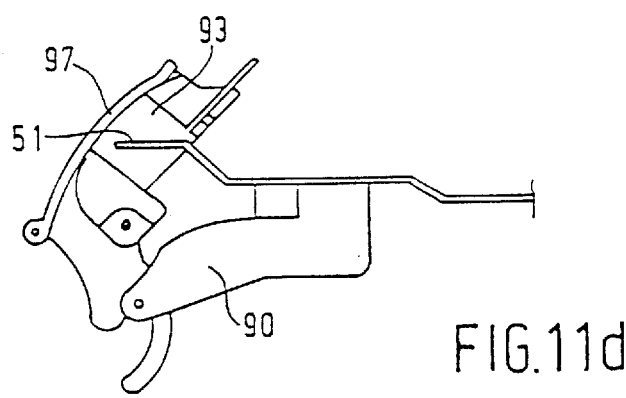

When the rod mechanisms 12, 13 are to be connected, hook 96 is placed round pin 91 (FIG. 11b). By subsequently pushing handle 97 further in the direction of the rod mechanism 12, strip 51 is pulled into the housing 98 of part 93. The end of strip 51 comprises a tapered part 106, which is connected, via two recessed part 107, to the elongated part of strip 51. When strip 51 is being slid into housing 98, legs 101 and 102 of wire spring 100 are pressed apart (FIG. 11c) by the tapered part 106, until parts 107 are disposed on a side of legs 101, 102 of wire spring 100 remote from the rod mechanism 12, and strip 51 is firmly connected to part 93 (FIG. 11d, FIG. 12). In order to release lock 24, knob 99 of part 93 must first be pressed in the direction indicated by arrow P25, so that legs 101 and 102 of wire spring 100 are moved apart and tapered part 106 of strip 51 can be removed from wire spring 100. Then the handle 97 can be moved from the position shown in FIG. 11 to the position shown in FIGS. 11c–b–a,whereby strip 51 moves out of part 93 and hook 96 becomes detached from pin 91. Folding of the buggy is not possible before part 94 has been tilted and strips 51 has been removed from part 93. Since at least two separate operations are required for releasing lock 24, the risk of lock 24 being accidentally opened, for example by a child, is only small.

FIGS. 13–16 show a second embodiment of a buggy 121 according to the invention, which on the whole corresponds to the buggy which is shown in FIG. 1.

Consequently, especially the differences between the two buggies will be discussed, whilst reference is made to the description above for those parts that are alike.

In buggy 121, rod 33 is directly connected to handle 35, and rod 33 does not include a rod member 34 which is telescopically movable therein.

The rod mechanism 13 connected to legs 3, 5 is constructionally identical to rod mechanism 13 of the buggy which is shown in FIG. 1. As is clearly shown in FIG. 13, buggy 121 does not comprise a lock 24. Instead of being fitted with a lock 24, buggy 121 comprises a locking mechanism which will be explained in more detail yet with reference to FIG. 14. A rod mechanism 122 extends between the girders 8 of buggy 121, which rod mechanism will likewise be explained in more detail with reference to FIG. 14.

Figure 14:
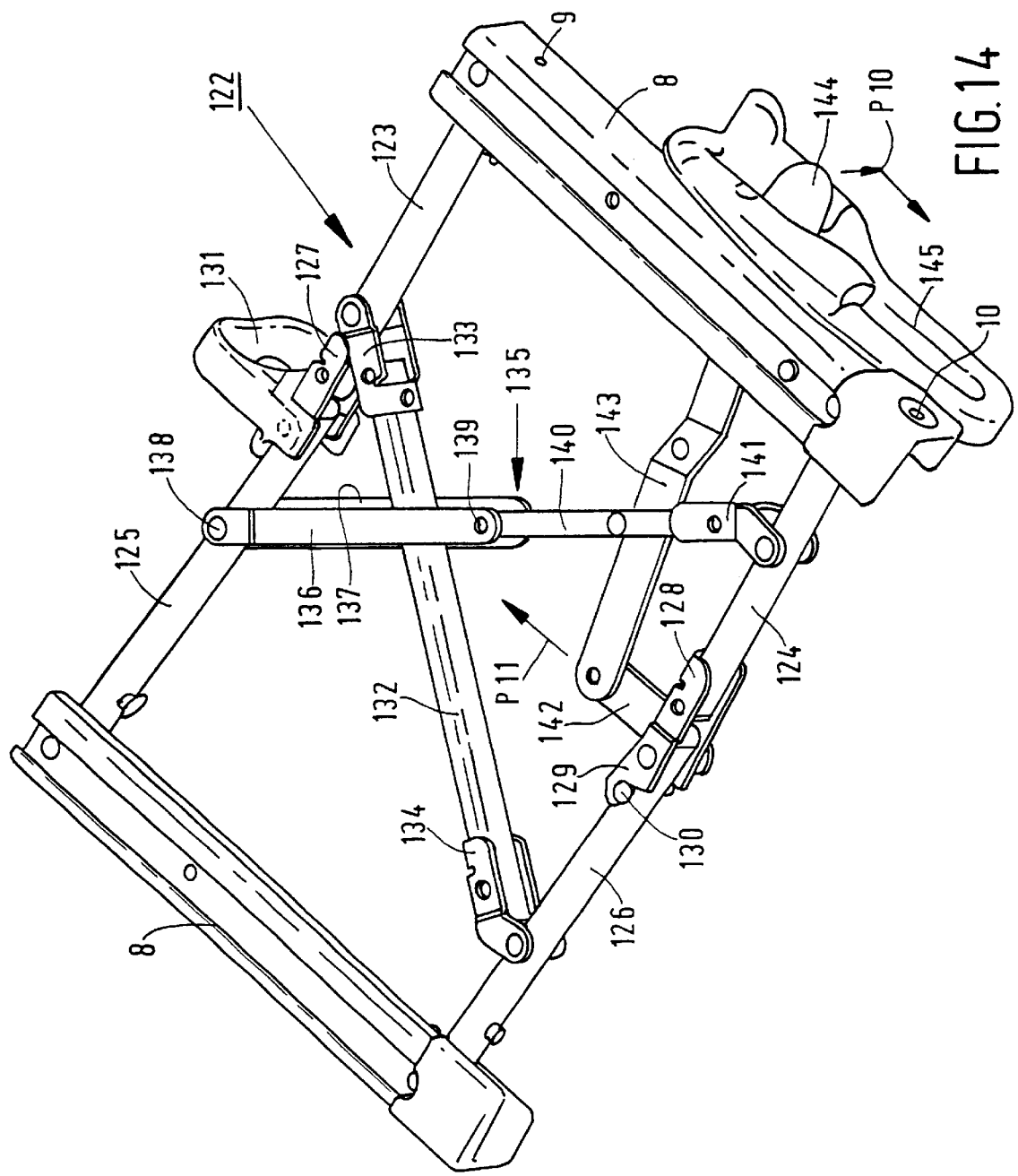
FIG. 14 is a perspective view of a rod mechanism present between two girders of the buggy of FIG. 13.
Figure 15:
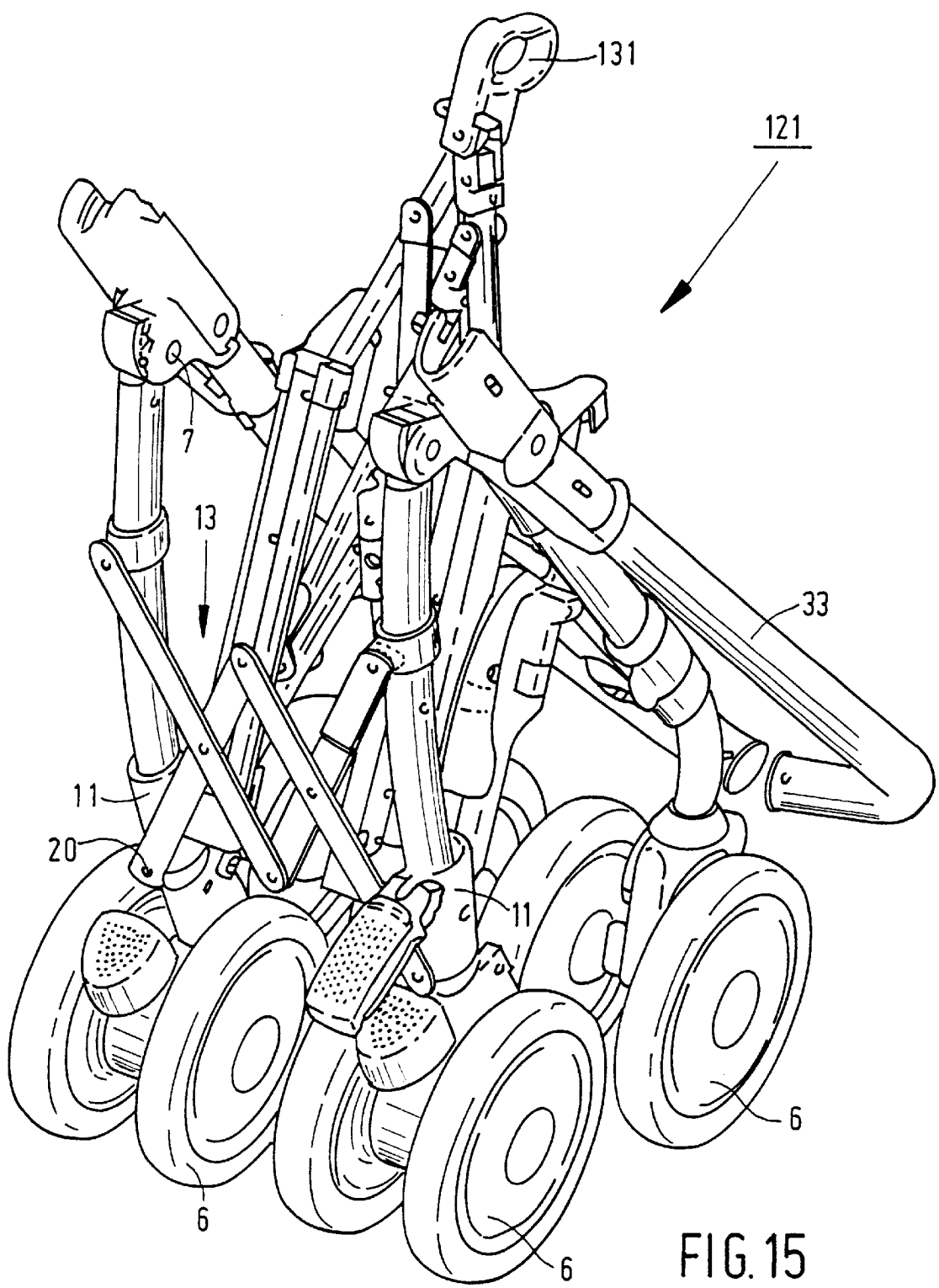
FIG. 15 is a perspective view of the buggy of FIG. 13 in folded condition.
Figure 16:
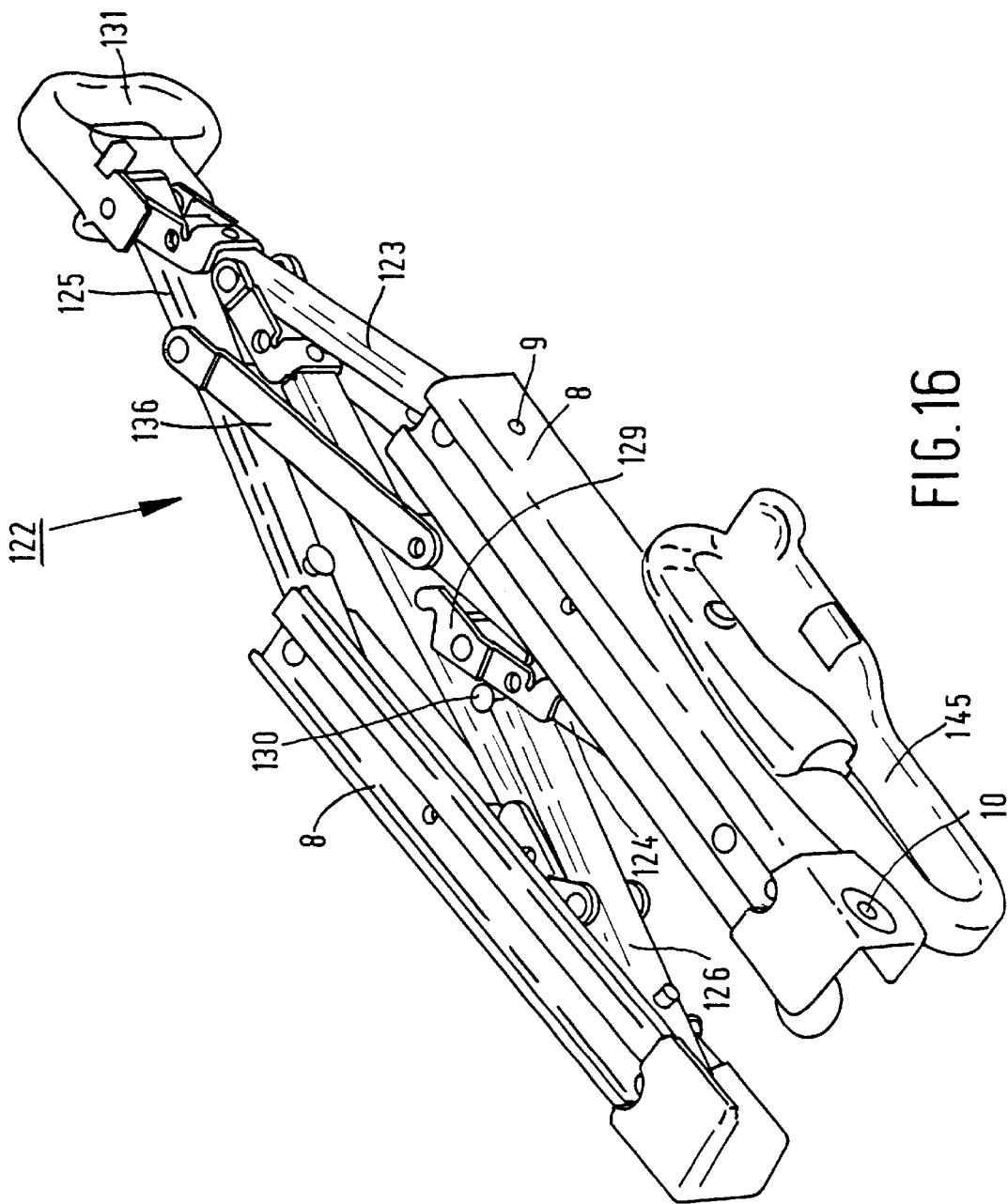
FIG. 16 is a perspective view of the rod mechanism of FIG. 14 in folded condition.

FIG. 14 shows the unfolded rod mechanism 122 which extends between the two girders 8. Rod mechanism 122 includes four rods 123, 124, 125, 126 which are pivotally connected to ends of girders 8, whereby rod pairs 123, 125; 124, 126 are pivotally interconnected by means of hinge blocks 127, 128, respectively. Hinge block 128 includes a hook 129, which is in engagement with a pin 130 attached to rod 126 in the unfolded position as shown in FIG. 14. Hinge block 127 includes a handle 131, by which the folded buggy 121 can be lifted, as is shown in FIG. 15. rod mechanism 122 furthermore includes a rod 132 extending diagonally between rods 123, 126, which is pivotally connected to rods 123, 126 by means of hinge blocks 133, 134. A diagonally extending rod 135 also extends between rods 124, 125. Rod 135 includes two strips 136, 137, which extend above and below rod 132, respectively. Strips 136, 137 are connected to rod 125 by means of a pivot pin 138. On a side remote from rod 125, strips 136, 137 are connected to a further strip 140 via a connecting element 139. Strip 140 is connected to rod 124, via a hindge block 141, on a side remote from strips 136, 137. Rod mechanism 122 furthermore includes a strips 142 extending transversely to hinge block 128, which strips is pivotally connected on a side remote from block 128 to an operating lever 143, one end of which is fitted with an operating handle 144. Operating handle 144 is present in a locking mechanism 145, which is disposed under a girder 8.

The thus-constructed rod mechanism 122, which is pivotally connected to U-shaped girders 8, seen in cross-sectional view, provides a solid construction which is practically undeformable both in the plane of girders 8 and in a direction transversely thereto.

Figure 13:
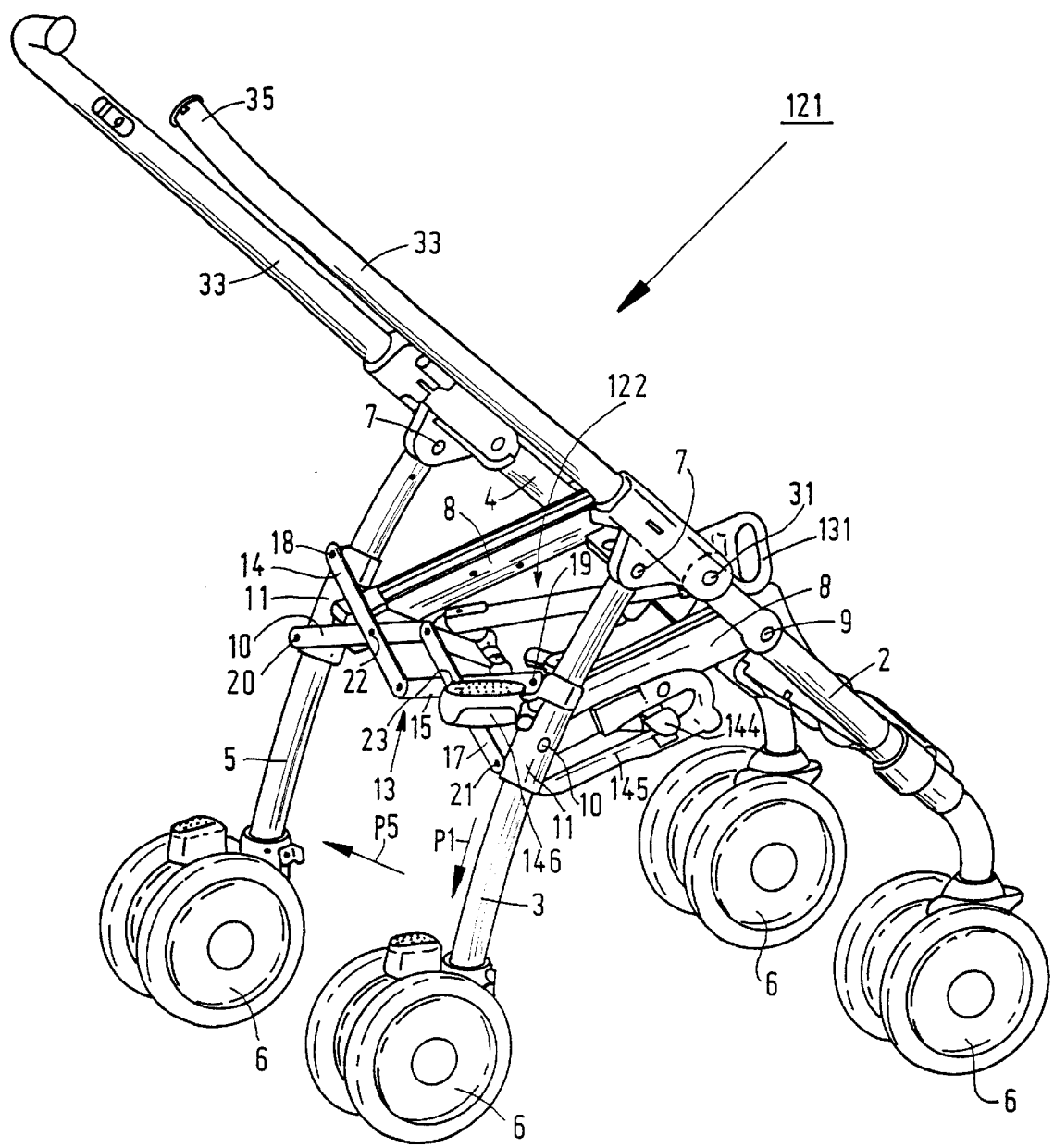
FIG. 13 is a perspective view of a second embodiment of a buggy according to the invention.

Folding of the buggy 121 shown in FIG. 13 takes place as follows. Handle 144 is moved downwards by hand against the spring force of lever 143, and subsequently it is moved in the direction of pivot pin 10 as indicated by arrow P10. Handle 144 is thereby moved through a slot present in locking mechanism 145. By moving handle 144 in this manner, strip 142 and the hinge block 128 connected thereto are moved in the direction indicated by arrow P11, as a result of which rod 124 is disconnected from rod 126 and rod mechanism 122 is ready for eing folded. Then a user can place is foot on a pedal 146 connected to block 11 in order to push block 11 in the direction indicated by arrow P1. By moving block 11 in the direction indicated by arrow P1, the rod mechanism 13 is folded and the block 11 connected to leg 11 will automatically be moved in the direction indicated by arrow P1 as well. Blocks 11 are moved together by folding rod mechanism 13, as a result of which the legs 3, 5 connected thereto will also be moved together at the same time. Also girders 8 will be moved together, whereby rod mechanism 122 is folded. Then the handles 35 are pivoted about pivot pins 31, after which the buggy 121 has reached the folded position which is shown in FIG. 15. Rod mechanism 122 is thus folded to the position which is shown FIG. 16.

What is claimed is:

1. A buggy comprising at least two pairs of legs, wherein each pair comprises a first leg and a second leg, which are each fitted with a wheel at one end, the first and the second leg of each pair are pivotally interconnected by means of a main pivot at a location some distance away from said wheels, wherein the first and the second leg of each pair are furthermore interconnected by means of a girder between said main pivot and said wheel, which girder is pivotally connected to the first leg with a first end and to an element which is slidably disposed along the second leg with a second end, whilst furthermore the two pairs of legs are interconnected by mean of at least two collapsible rod mechanisms, wherein the first rod mechanism extends between the second legs of said two pairs, which first rod mechanism includes first rods which are pivotally connected to the elements which are capable of sliding movement along the second legs, as well as second rods which are pivotally connected to the second legs, characterized in that the second rod mechanism extends between the girders of both pairs, wherein the elements which are pivotally connected to said girders are spaced from the wheels by a greater distance in an unfolded position of the buggy than in a folded position thereof.

2. A buggy according to claim 1, characterized in that said first and said second rod mechanism can be locked together in an unfolded position.

3. A buggy according to claim 1, characterized in that the buggy furthermore includes two push rods, which are each pivotally connected to one of said pair of legs with a first end and which are provided with a handle at a second end, wherein each push rod is pivotable from a first pushing position extending substantially in line with the first leg to a second position in which the handle is positioned near the wheel connected to the second leg.

4. A buggy according to claim 3, characterized in that the push rod can be locked in the first position, wherein the handle connected to the push rod includes an unlocking knob for unlocking the push rod from the first position.

5. A buggy according to claim 3, characterized in that the push rod comprises at least two telescoping tubes, which can be locked together in at least two positions, with the length of the push rod being adjustable.

6. A buggy according to claim 4, characterized in that the unlocking knob provided in the handle can also be used for unlocking the tubes with respect to each other.

7. A buggy according to claim 1, characterized in that said buggy comprises a seat, which can be detachably connected to said girders(s), and a back which is connected thereto.

8. A buggy according to claim 1, characterized in that said buggy comprises a reclining bucket which is detachably connected to said legs.

9. A buggy according to claim 1, characterized in that a footboard in present between the two first legs, which footboard can be moved in directions towards and away from the wheels.

* * * * *